Oct. 10, 1950 K. H. SMITH 2,524,937
FLEXIBLE SPIKE TOOTH HARROW
Filed Aug. 1, 1946 2 Sheets-Sheet 2

Inventor
Kenneth H. Smith
By his Attorney
Harry W. Kilgore

Patented Oct. 10, 1950

2,524,937

UNITED STATES PATENT OFFICE 2,524,937

FLEXIBLE SPIKE TOOTH HARROW

Kenneth H. Smith, Minneapolis, Minn.

Application August 1, 1946, Serial No. 687,576

9 Claims. (Cl. 55—86)

My invention relates to improvements in harrows and has for its objects; first, to provide a harrow in which the angle of its teeth is automatically changed, relative to vertical positions, by pulling the harrow in an opposite direction; secondly, to provide a harrow that is extremely simple, highly efficient and of relatively small cost to manufacture. Other objects of the invention will be apparent from the following description, reference being had to the drawings.

This invention is equally well adapted for embodiment in a harrow having a rigid frame or in a harrow in which the frame consists of a plurality of flexibly connected sections.

To the above end generally stated, the invention consists of the novel devices and combination of devices hereinafter described and defined in the claims.

In the accompanying drawings, which illustrate the invention, like characters indicate like parts throughout the several views.

Referring to the drawings:

Fig. 4 is a fragmentary plan view showing another embodiment of the invention.

Figure 1:
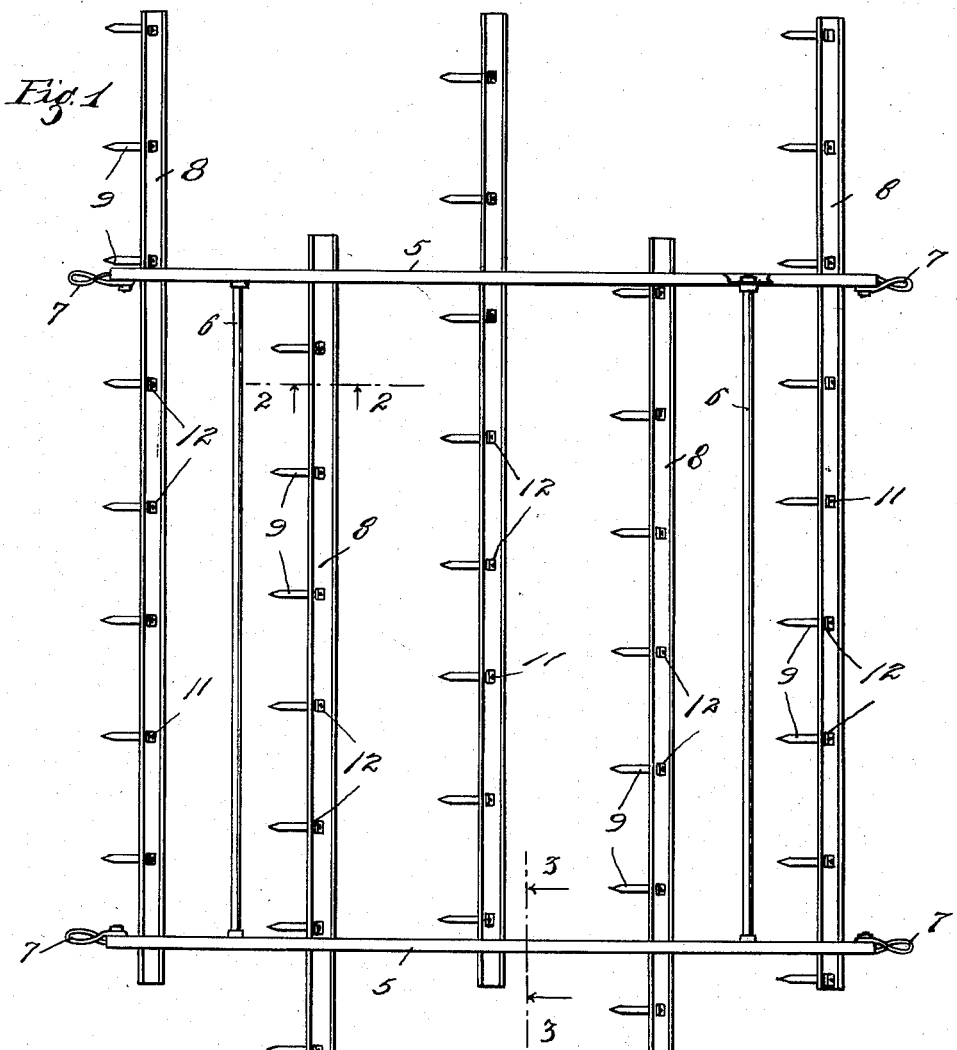
Fig. 1 is a plan view of the improved harrow.
Figure 2:
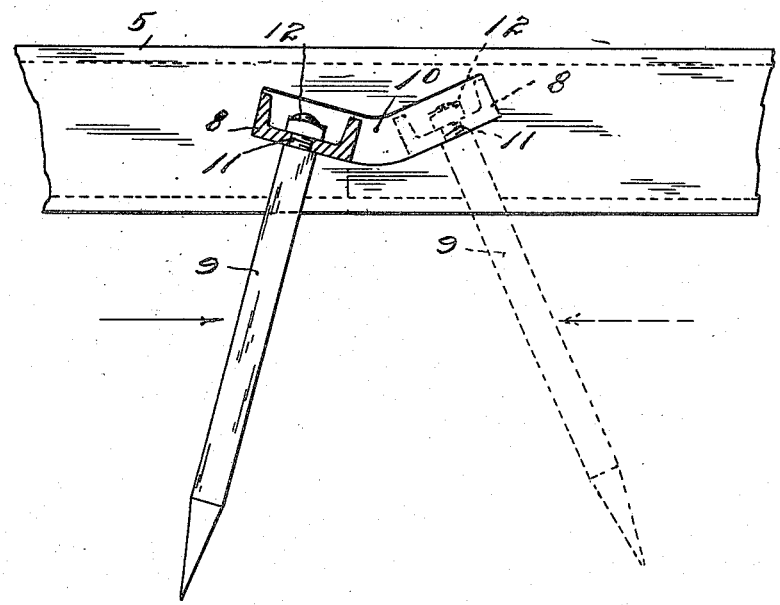
Fig. 2 is a fragmentary view partly in side elevation and partly in section taken on the line 2—2 of Fig. 1 on an enlarged scale, and also showing the tooth bar and tooth in different positions by means of broken lines.
Figure 3:
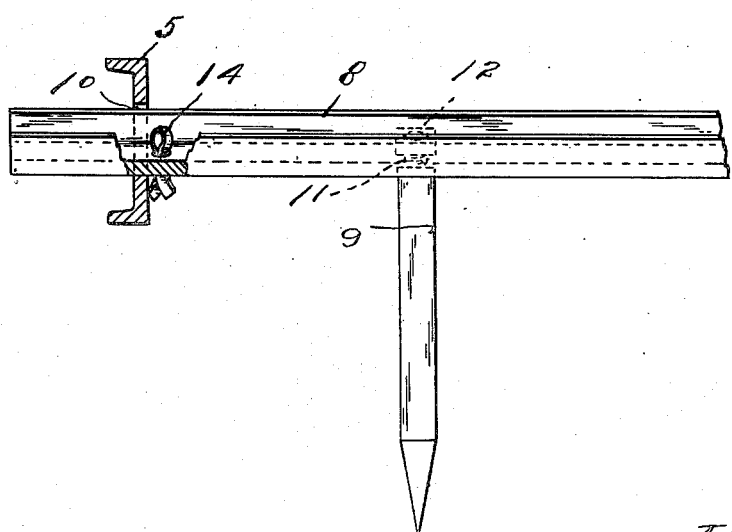
Fig. 3 is a fragmentary view partly in elevation and partly in section taken on the line 3—3 of Fig. 1 on an enlarged scale.

Referring first to the invention shown in Figs. 1, 2 and 3, wherein the invention is embodied in a rigid frame. This frame consists of a pair of laterally spaced, horizontally disposed channel bars 5 rigidly connected by a pair of cross-tie rods 6.

Extending transversely of the harrow frame is a plurality of horizontally disposed channel bars 8 each of which is equipped with a plurality of teeth 9. Each bar 8 extends through longitudinal slots 10 in the web of the side bars 5.

The teeth 9 are rigidly secured to the bars 8 by having on their upper ends screw-threaded studs 11 to which are applied nuts 12. The studs 11 extend through holes in the webs of the channel bars 8 and the nuts 12 impinge said webs on the inner side of the said channels and rigidly hold the teeth 9 with their upper ends impinging the outer side of the web of the bars 8.

Each slot 10 from a medial point is outwardly and upwardly inclined on different angles. When the harrow is being pulled toward the right with respect to Fig. 2, the bars 8 are in the rearmost portions of the slots 10 and the teeth 9 are downwardly and rearwardly inclined, see Fig. 2. To change the angle of the teeth 9 the harrow is pulled toward the left with reference to Fig. 2. During the initial reverse pull of the harrow, the teeth 9, by their contact with the ground will remain substantially stationary and the side bars 8 will move endwise in relation thereto and thus shift the bars 8 from their full line positions, as indicated by full lines in Fig. 2, to their dotted line positions as indicated by broken lines in the same figure. Or, in other words, the bars 8 will be shifted into the rear portions of the slots 10 with reference to the direction of pull of the harrow and thereby change the angle of the teeth 9 as indicated by broken lines in Fig. 2.

It will thus be seen that by simply changing the direction of pull of the harrow the bars 8 will be shifted from one end portion of the slots 13 to the other and thereby automatically change the angle of the teeth 9.

Cotter pins 14 in the bars 8 at the inner faces of the side bars 5 hold said bars 8 from shifting endwise in the slots 13.

The harrow may be attached to a tractor or draft animals by any suitable connection, not shown, to the clevis 7.

Referring now to the structure shown in Fig. 4, wherein parts that correspond to like parts in Figs. 1, 2 and 3 are given the same reference numerals followed by a prime. Each side bar 15 is made up of a plurality of pivotally connected sections 16. As shown, there are two opposite sections 16 for each bar 8'. Obviously the flat sections 16 for each bar 8' is free for pivotal movements in vertical planes relative to the connected sections 15.

From what has been said, it will be understood that the invention described is capable of modifications as to details of construction and arrangement within the scope of the invention herein disclosed and claimed.

What I claim is:

1. A harrow comprising a frame having pairs of opposite side bars formed with transversely aligned, substantially longitudinal slots, each slot being upwardly and outwardly inclined from its center, a transverse bar having a plurality of teeth mounted thereon carried in pairs of opposing slots for bodily sliding movement from one inclined portion thereof to the other by changing the direction of pull of the harrow to change the angle of the teeth relative to a vertical position.

2. The structure defined in claim 1 in which the inclination of one end portion of each slot is greater than the other end portion thereof.

3. A harrow comprising a pair of opposite side bars formed with transversely aligned, substantially longitudinal slots, each slot being upwardly and outwardly inclined from its center, a transverse bar having a plurality of teeth mounted thereon carried in pairs of opposing slots for bodily sliding movement from one inclined portion thereof to the other by changing the direction of pull of the harrow to change the angle of the teeth relative to a vertical position.

4. The structure defined in claim 3 in which the inclination of one end portion of each slot is greater than the other end portion thereof.

5. The structure defined in claim 3 in which the side bars are made up of pivotal sections.

6. The structure defined in claim 1 in which the frame comprises flexible sections.

7. The structure defined in claim 3 in which the transverse bars are channel bars that have relatively wide webs that slidably rest on the side bars at the bottoms of the slots and relatively narrow upturned flanges that have a working clearance with the side bars at the tops of the slots.

8. The structure defined in claim 3 in which the transverse bars are channel bars and in which the upper ends of the teeth impinge the under sides of the webs of the transverse bars and have nut-equipped screw-threaded studs that extend through holes in said webs.

9. A harrow comprising a pair of laterally spaced side bars formed with transversely aligned, substantially longitudinal slots, the end portions of each slot being in diverging relation, a transverse bar having a plurality of teeth mounted thereon carried in pairs of opposing slots for movement from one inclined position thereof to the other by changing the direction of pull of the harrow to change the angle of the teeth relative to a vertical position.

KENNETH H. SMITH.

REFERENCES CITED

The following references are of record in the file of this patent:

UNITED STATES PATENTS

| Number | Name | Date |
|---|---|---|
| 180,498 | Pounder | Aug. 1, 1876 |
| 329,040 | Hirshheimer | Oct. 27, 1885 |
| 2,064,269 | Pope | Dec. 15, 1936 |